Nov. 28, 1939.  H. V. WILLIAMS, JR  2,181,796
KEY RETAINER IDENTIFICATION TAG
Filed July 7, 1939
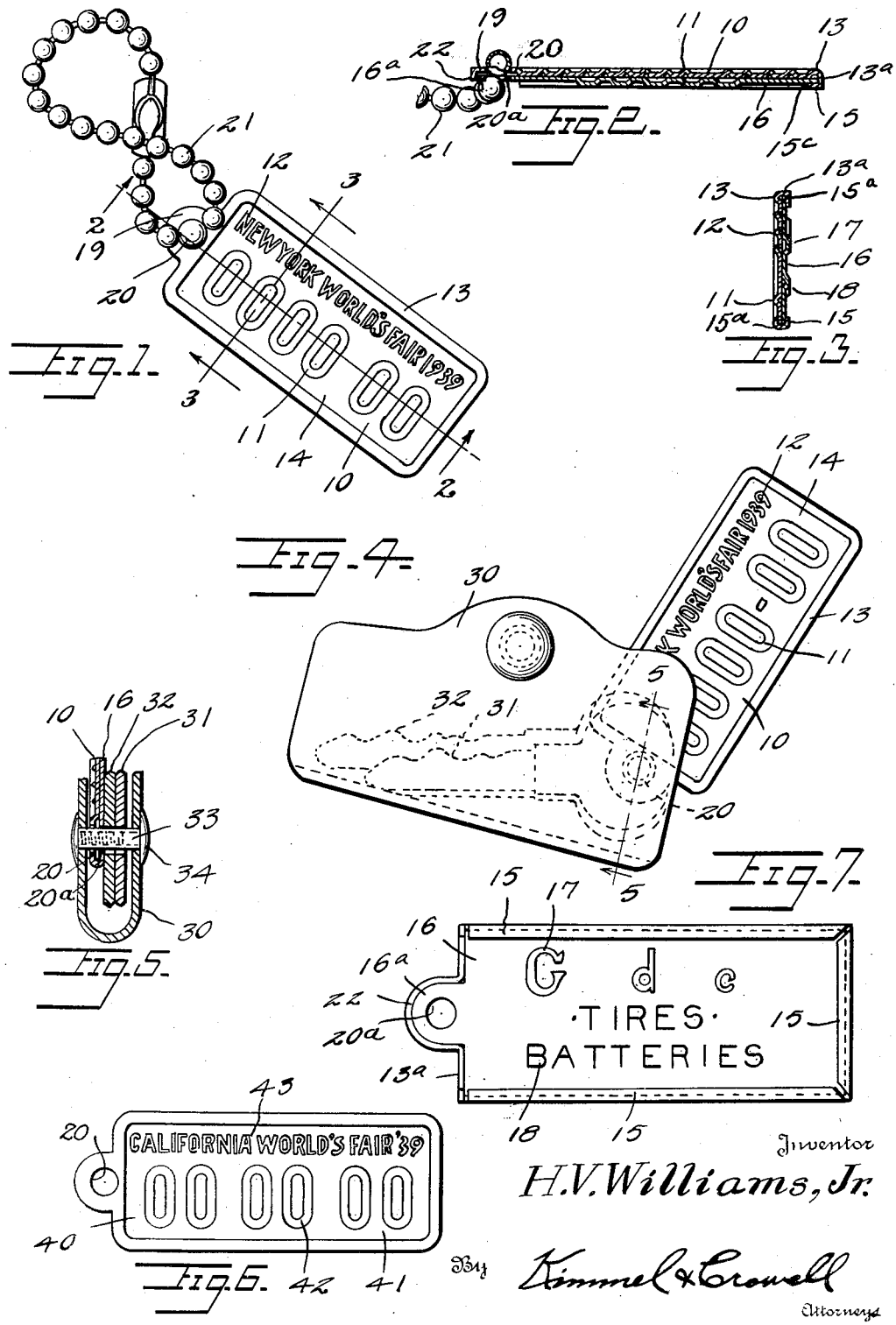

Patented Nov. 28, 1939

2,181,796

UNITED STATES PATENT OFFICE 2,181,796

KEY-RETAINER IDENTIFICATION TAG

Herschel V. Williams, Jr., New York, N. Y., assignor to The B. F. Goodrich Company, New York, N. Y., a corporation of New York Application July 7, 1939, Serial No. 283,271

2 Claims. (Cl. 40—17)

This invention relates to key-retainer identification tags, and the chief object of the invention is to provide for use by the owner of an automobile a personalized tag substantially in the form of an automobile license plate in miniature provided on one face thereof with embossed indicia corresponding to the indicia on one face of the automobile license plate which has been issued to the owner of the automobile.

A further object of the invention is to provide, for use by the owner of an automobile, an identifying tag substantially in the form of an automobile license plate in miniature having one of its faces formed in a manner to provide a replica of one of the faces of the automobile license plate which has been issued to the owner of the automobile.

An object of this invention is to provide a tag as a miniature replica or duplicate of the holder's automobile license plate, including its state designation and number, the tag being attractively ornamental in appearance, novel in character, and at the same time being useful in identifying the owner of the retainer and keys through the automobile license plate designation without requiring the added material of the owner's name and address on the tag.

It is well known that in many instances the owner of an automobile is unable to remember the exact number of his license plate and where a number of identical vehicles are closely related, the owner has difficulty in identifying his vehicle. It is therefore, another object of this invention to provide a means which will be normally carried in the pocket of the vehicle owner by which he will be able to quickly identify his vehicle.

Further objects are to provide a concealed backing to provide means for connecting a key retainer to the tag, and to provide a smooth edge of the tag while preserving the appearance of the front face as a miniature license plate. The backing plate serves as a reinforcement, permitting the use of light gauge sheet metal and thus facilitating embossing, and the backing may carry any desired indicia, embossed or otherwise provided on the rear face of the tag, and may include for example, advertising matter.

These and further objects will be apparent from the following description, reference being had to the accompanying drawing in which:

Figure 1 is a plan view of a key retainer and tag, constructed according to and embodying the invention. The tag illustrated is substantially in miniature replica of a New York state automobile license plate for the year 1939.

Figure 2 is a section taken along the line 2—2 of Figure 1,

Figure 3 is a section taken along the line 3—3 of Figure 1,

Figure 4 is a view like Figure 1, but showing the tag in connection with a different form of key retainer, Figure 5 is a section taken along the line 5—5 of Figure 4, Figure 6 is a plan view of a tag substantially in the form of a miniature replica of a California automobile license plate for the year 1939, and Figure 7 is a rear elevation of the tag.

In the attainment of the above-stated objects, and with reference to the embodiment of Figures 1 to 3, I provide a front face member 10 of sheet metal which is rectangular in plan and shaped substantially in the form of an automobile license plate in miniature having license number indicia 11 and state and year designations 12 embossed in its front face. The plate 10 is formed on its front face with an endless embossed reinforcing bead 13 disposed throughout the lengthwise and transverse marginal portions of such face. The bead 13, for the major portion of its length in transverse section is of U-shaped contour and opens at the rear face of member 10. In the illustrative embodiment of Figure 1, the tag is substantially in miniature a replica of the regular automobile license plate for the state of New York and for the year 1939. The background 14 of its front face is colored yellow and the raised embossings 11, 12 and the bead 13 are colored black, as by painting or enameling, to maintain the similarity to the regular automobile license plate.

The bead 13 has the outer side 13ᵃ of each of its lengthwise portions and the outer side of its outer endwise portion of greater cross sectional length than the cross sectional length of the inner side of each of said portions. The said outer sides 13ᵃ extend beyond the inner face of the member 10 and merge into inwardly directed flanges 15 disposed at right angles to the said sides 13ᵃ. The flanges 15 are arranged in parallel spaced relation with respect to the rear face of member 10 to form a pair of longitudinal channels or grooves 15ᵃ and a transverse channel or groove 15ᵇ. The flanges 15 on the outer sides 13ᵃ of the lengthwise portions of the bead 15 have the corresponding ends thereof spaced from the ends of the flange 15 on the outer side 13ᵃ of the said outer end portion of the bead 13. The said lengthwise portions and the said outer end portion of the bead 13 in connection with the flanges 15 coact to form a pocket for the reception of a reinforcing or backing plate 16. The channels or grooves are disposed about three sides of and at the rear of member 10 whereby what may be termed the mouth of the pocket is at the remaining side of the member 10, that is to say at the inner end portion of the bead 13. The backing plate 16 reinforces the structure so that the use of light gauge sheet metals, easily embossed, is permissible while an adequately stiff structure of the tag nevertheless is provided. The backing plate 16 also presents surface space that may bear any desired indicia which may be supplied by embossings 17, 18 formed in the plate preferably before it is assembled with the face member 10.

At the end of the member 10 opposite that end provided with a flange 15, the body of member 10 is formed with a lateral arm which provides a tab 19 having an aperture 20 for connection with a key retainer. The tab 19 is integral at its inner end with and disposed substantially centrally of the inner end portion of the bead 13. The key retainer itself may be in the form of a beaded chain 21. The metal of the face member 10 preferable is folded or bent rearwardly of the tab extension 19 of the plate 10 as shown at 22 in Figure 2 to form a pocket within which tab 16ª of the plate 16 is adapted to engage and to assist in retaining the plate in its assembled relation with the face member and to provide a smooth edge entirely around the periphery of the tag. The tab 16ª is formed with an opening 20ª for registry with the opening 20.

The tag may be connected with any suitable form of key retainer. In Figures 4 and 5 the tag 10 is connected with a key retainer 30 of the leather folder type. Here the tag is mounted upon a detachable post of the retainer along with keys 31 and 32. Such post may comprise cooperating headed screw parts 33 and 34 passing through the leather folder, the keys, and the apertured tab of the tag 10. The tag may be swung into the folder if desired, or it may be left extended.

The tags preferably, are distributed upon individual order so that each owner will have the identifying indicia of his own automobile license plate, which fact is immediately suggested by the very close resemblance of the tag to the license plate, and just as all automobile license plates differ as to jurisdictional type and indicia, the key retainer tags will all differ in the same respects, each being individual to the owner.

It is preferred that all the identifying characteristics of the key-retainer tags correspond to the identifying indicia of the license plates of the respective jurisdictions. For example, the identifying indicia for tags in California for the year 1939 will appear as illustrated at 40 in Figure 6, and the colors in this case will be dark blue for the background 41 of the face of the tag and orange for the embossed indicia 42 and 43. The key-retainer tags for owners in other states and jurisdictions, should be marked and colored in accordance with the practice for regular automobile license plates in the respective areas.

In the production of the tag hereinbefore described, the plate 10 may be initially provided with the confronting channel members or flanges 15 and 15ᵇ with the face of the plate 10 blank. The tab 19 may also be provided with a rearwardly projecting flange 22 forming a pocket within which the tab 16ª of the backing plate 16 is adapted to engage. The desired identifying indicia may then be stamped from the plate 10 and the body of the plate 10 colored similar to the main color of the individual license tag. The embossed indicia may then be colored with the particular color of the license numbers and other indicia on the plate 10. When this has been done, the backing plate 16 may be mounted in the pocket formed by the side flanges 15 and the end flange 15ᵇ, the plate 16 being moved as viewed in Figure 2 from the left to the right until one end of the plate 16 engages against the rearwardly projecting flange 13ª. At this time the tab 16ª will be in a position to engage within the tab pocket formed by the flange 22. The backing plate 16 may be provided with any desired indicia which may be of an advertising characteristic.

With a device of this kind the owner of the vehicle can easily identify his own vehicle from the license numbers on the plate 10. As hereinbefore stated in many instances where identical motor vehicles are parked or positioned closely adjacent each other, it is not infrequent that an owner is at first unable to identify his own vehicle, due to the fact that he cannot remember all of his license plate numbers. With a device of this kind the owner has only to look on the plate 10 to see what his license plate numbers are and then identify his vehicle.

This device may also be used as a means of identification on parking lots where an owner may have lost his portion of the parking check or ticket as the license number on the plate 10 will be sufficient for the operators of the parking lot to identify the owner of the vehicle.

What I claim is:

1. In a key retainer automobile identification tag for use by owners of automobiles, said tag being substantially in the form of a miniature replica of an automobile license plate, said tag comprising a thin body member having front and rear faces, said member having its front face formed with spaced embossed reinforcing parts simulating the indicia on one face of the automobile license plate issued to the user of the tag, said member having its front face formed with an embossed endless reinforcing bead conforming in outline to the shape of said member, said bead being disposed throughout the marginal portions of said front face and surrounding in spaced relation the said spaced embossed parts, said bead including lengthwise portions, an outer end portion and an inner end portion, said member having the embossed bead and embossed parts on the front face of a like color and the remaining portion of such face of a color different from that of the color of said bead and parts, the lengthwise portions and the outer end portion of the said reinforcing bead being of U-shaped form in transverse cross section, a laterally disposed apertured attaching tab merging at its inner end into the outer side of the inner end portion of said bead, said member having parts spaced from the bight portion of the bead and integral with and correlating with the remaining portions of the bead to form a pocket on the rear face of said member, the mouth of said bocket being disposed at the said inner end portion of the bead, and a reinforcing plate mounted in said pocket.

2. In a key retainer automobile identification tag for use by owners of automobiles, said tag being substantially in the form of a miniature replica of an automobile license plate, said tag comprising a thin body member having front and rear faces, said member having its front face formed with spaced embossed reinforcing parts simulating the indicia on one face of the automobile license plate issued to the user of the tag, said member having its front face formed with an embossed endless reinforcing bead conforming in outline to the shape of said member, said bead being disposed throughout the marginal portions of said front face and surrounding in spaced relation the said spaced embossed parts, said bead including lengthwise portions, an outer end portion and an inner end portion, said member having the embossed bead and embossed parts on the front face of a like color and the remaining portion of such face of a color different from that of the color of said bead and parts, the lengthwise portions and the outer end portion of the said reinforcing bead being of U-shaped form in transverse cross section, a laterally disposed apertured attaching tab merging at its inner end in the outer side of the inner end portion of the bead and formed with a pocket on its rear face opening at the inner end portion of the bead, said member having parts spaced from the bight portion of the bead and integral with and correlating with the remaining portions of the bead to form a pocket on the rear face of said member having its mouth at the said inner end portion of the bead, and a reinforcing plate mounted in the pocket on the rear face of said member and being formed with a laterally disposed apertured extension arranged within the pocket on said tab and with the apertures of the arm and extension in registry.

HERSCHEL V. WILLIAMS, Jr.